United States Patent
Smith

[15] 3,693,512
[45] Sept. 26, 1972

[54] APPARATUS FOR HANDLING PARTICULATE MATERIAL
[72] Inventor: Fred T. Smith, Aurora, Ill.
[73] Assignee: Barber-Greene Company, Aurora, Ill.
[22] Filed: Jan. 21, 1971
[21] Appl. No.: 108,506

[52] U.S. Cl. ..............................94/46, 94/40, 94/44
[51] Int. Cl................................................E01c 19/48
[58] Field of Search..............................94/40, 44, 46

[56] References Cited

UNITED STATES PATENTS

| | | | |
|---|---|---|---|
| 2,139,027 | 12/1938 | McConnaughay | 94/40 |
| 2,195,221 | 3/1940 | Millikin | 94/40 |
| 2,201,493 | 5/1940 | Jorgensen | 94/44 X |
| 2,647,448 | 8/1953 | Osterfeld | 94/44 |
| 2,911,892 | 11/1959 | Pollitz | 94/46 R |
| 3,330,188 | 7/1967 | Layton | 94/46 R |

Primary Examiner—Jacob L. Nackenoff
Attorney—McDougall, Hersh & Scott

[57] ABSTRACT

A method and apparatus for handling particulate material which is particularly adapted for loading particulate paving material into a paving device which is either a separate unit connected thereto or carried thereby characterized by a scraper for lifting the material from a surface, a conveyor for elevating the material to a discharge point, and a storage space for storing material. The elements of the material handling device are arranged so that the device will rapidly load a hopper of the paving device to a predetermined level and maintain that level while storing any conveyed material which is in excess of the amount needed to maintain the level, and using the stored material when the amount of material being conveyed by the conveyor decreases below the demand of the material required to maintain the hopper full.

13 Claims, 4 Drawing Figures

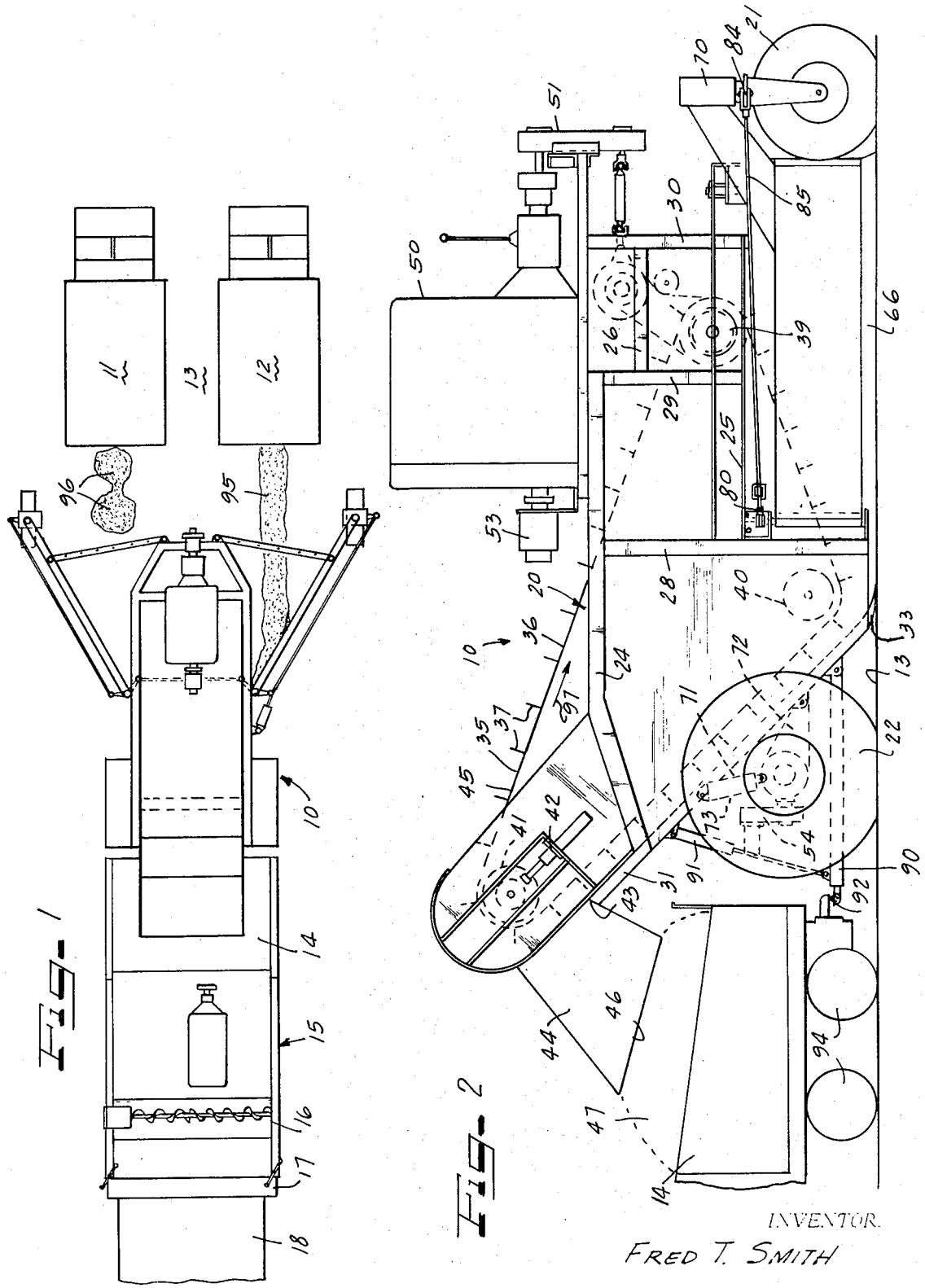

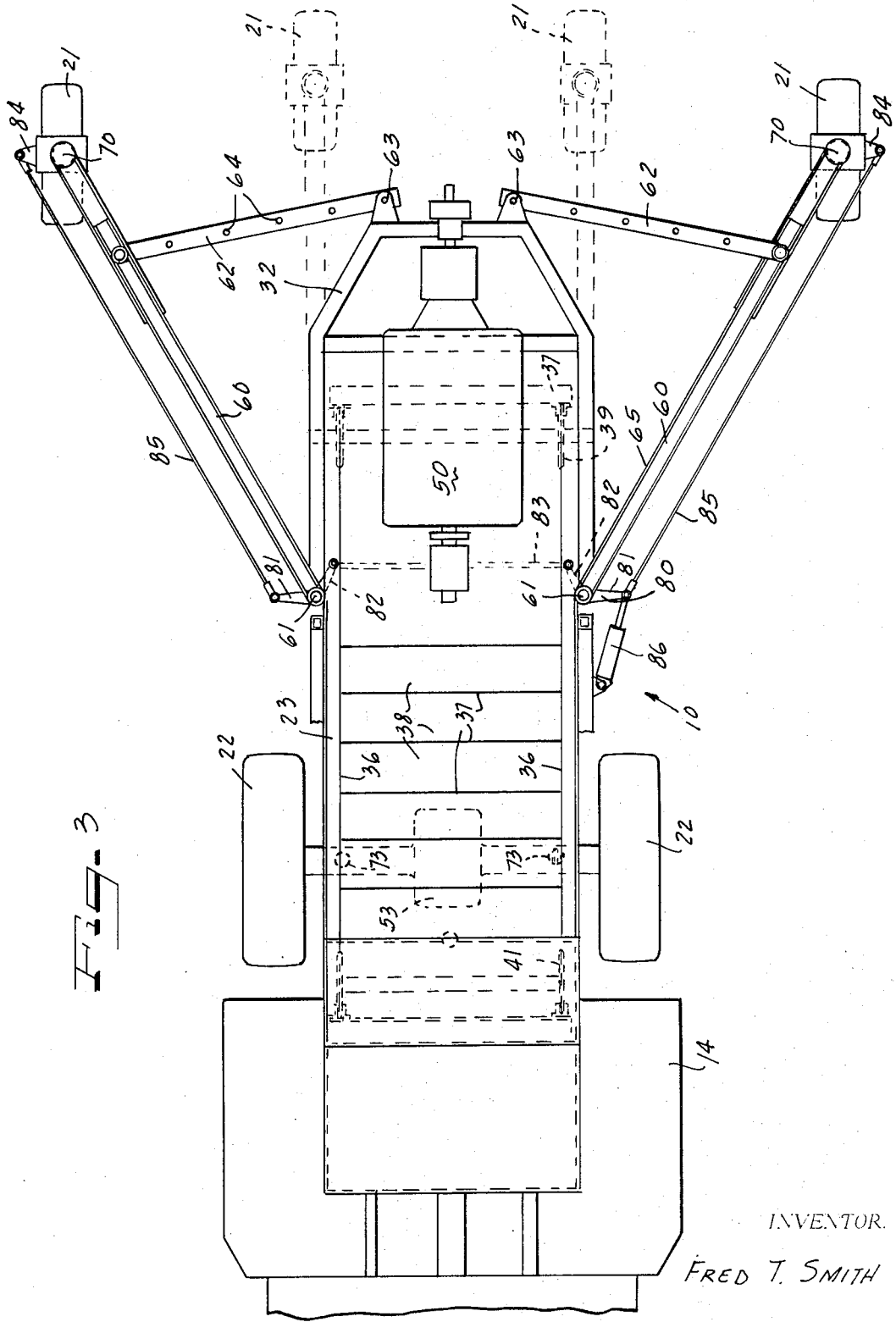

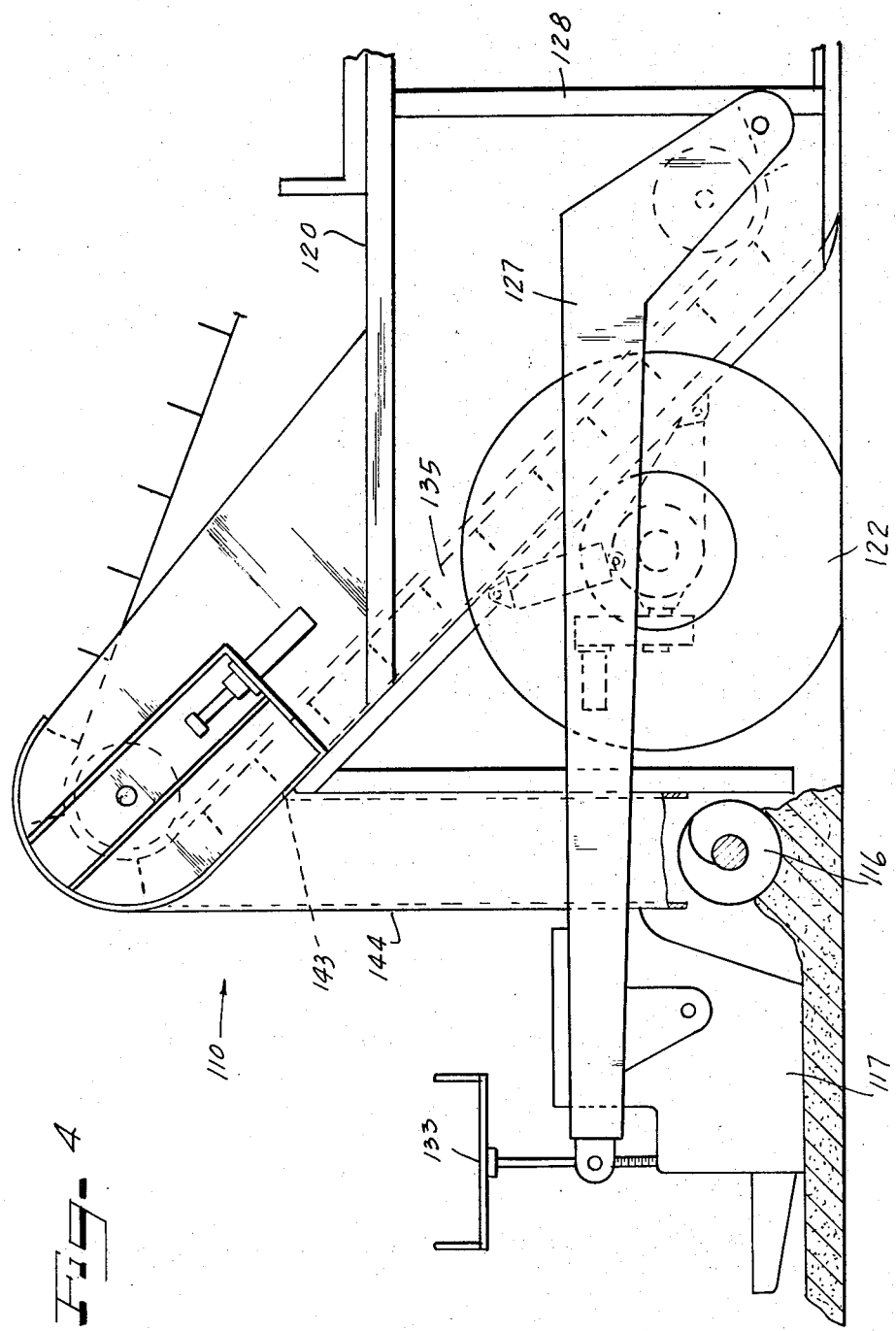

APPARATUS FOR HANDLING PARTICULATE MATERIAL

BACKGROUND OF THE INVENTION

1. Field of the Invention

The present invention is directed to a method and apparatus for handling particulate materials and is particularly useful in handling particulate paving materials.

2. The Prior Art

In presently known methods of paving with a particulate material, such as asphalt, a paving machine, which has a hopper discharging into a spreading device and a screed for working the spread material, is loaded with the paving material by positioning a dump truck ahead of the machine and dumping the contents thereof into the hopper. Various disadvantages have occurred with such a system or method of paving. For example, in many instances the paving device, while receiving material from the dump truck, must push the truck as it is unloading its contents into the hopper.

Another disadvantage results from removing an empty dump truck and positioning a full truck which is time consuming. In some instances due to the lack of paving material during the time of changing trucks the paver must be stopped or its rate of paving reduced. This problem occurs especially in large capacity pavers which do not have sufficient capacity in the hopper to meet the demands of the device for any extended period of time.

Due to the necessity of maintaining materials for the paver so that it can continue to operate at a maximum paving rate, it is desirable to always have a loaded truck available to move into a material transferring position with the paver as soon as the previous truck has been disengaged from the device. Thus the presently know methods require a large number of trucks and drivers to keep a paving device operating at a maximum rate and requires a large capital expense for equipment and a high labor cost for personnel such as drivers.

Windrow loaders have also been used to load a hopper of a paving device. However, presently known loaders require the material to be in a uniform windrow in order to insure a uniform rate of loading.

SUMMARY OF THE INVENTION

The present invention is directed to a method and apparatus for handling particulate material which is particularly adapted for use in a paving operation. The invention involves providing a machine which lifts the particulate material from the surface where it has been deposited, conveys it to a discharge point and stores excess material until it can be utilized by the machine being loaded. The storage means enables the holding of material when received at a greater rate than required by the device using it and the subsequent feeding of that material to the device when the rate of receiving the deposit of material decreases below the demand of the apparatus being loaded. The device for performing the method can be a separate machine utilized with a standard paving device; one embodiment includes providing the material spreading means and screed on the rear of the device to provide a single loading and paving machine.

Accordingly, it is an object of the present invention to provide a method and apparatus for loading material deposited on the surface into a hopper of a device utilizing the material.

Another object of the present invention is to provide a method and apparatus for handling particulate material, such as paving material, which increases the efficiency of a paving operation.

A still further object of the present invention is to provide a method and apparatus for loading a hopper at a rate dependent on the demand of the device being loaded regardless of the supply of material available.

Yet another object of the present invention is to provide a method and apparatus for loading a hopper of a device in response to the demands of the device with storage of excess material until it can be subsequently used.

A still further object of the present invention is to provide a self loading paving device.

Yet another object of the present invention is to provide a device for lifting material from a surface having a conveyor which pulls the device forward as the conveyor engages the material being lifted.

Other objects and features of the present invention will more fully become apparent in view of the following detailed description taken in conjunction with the accompanying drawings illustrating one embodiment of the invention.

BRIEF DESCRIPTION OF THE DRAWINGS

FIG. 1 is a plan view of the device of the present invention utilized in loading a paving device;

FIG. 2 is a side elevation of the device of the present invention;

FIG. 3 is a plan view of the device of the present invention; and

FIG. 4 is a side elevation of another embodiment of the present invention, with certain portions broken away.

DESCRIPTION OF THE PREFERRED EMBODIMENTS

The principles of the present invention are particularly adapted in a material handling machine or device generally indicated as a loader 10 for lifting particulate material deposited by trucks such as 11 and 12 on a surface 13 and loading it into a supply means such as a hopper 14 of a paving or finishing device 15. The paving device 15 has a spreading means such as a transversely disposed auger 16 for spreading the particulate material across the surface to be paved which material is acted on by a screed 17 that finishes it into a strip 18 of pavement.

As best illustrated in FIGS. 2 and 3, the material handling device 10 has a main frame 20 which is supported on transporting means such as a pair of front dirigible wheels 21,21 and a pair of rear wheels 22,22. The frame 20 has a pair of parallel extending side frames 23,23 (FIG. 3), each of which has a structure formed of horizontally extending frame members such as 24, 25 and 26 and vertically extending frame members such as 28, 29 and 30. The two side frames 23 are interconnected adjacent the rear of the device by a slanting pan structure 31 and adjacent front end of the side frame by a front end structure 32 (FIG. 3).

The pan 31 at its lower end is provided with a lifting means illustrated as a curved end section 33 for scraping or scooping particulate material off the surface 13 and lifting the material onto the pan 31. The curved end section 33 extends between the pair of side frames 23,23.

To move the material in an upward stream along the slope of the pan 31, a conveying means or conveyor generally indicated at 35 if provided. As illustrated, the conveying means 35 has a pair of continuous chains 36,36 interconnected and spaced apart by transverse blades or bars 37 which are spaced apart along the chains to provide opening 38. The continuous chains 36,36 are illustrated as being supported on three pairs of sprockets 39, 40 and 41 with each pair mounted on a shaft and the pairs arranged in a triangular configuration with their shafts extending transverse to and between the side members 23 of the frame 20. The sprocket pair 39 is a drive sprocket and is positioned at the forward end of the frame 20. The sprocket pair 40 is positioned above the end portion 33 and the third pair of sprockets 41, which has adjustment means 42, is positioned above an upper edge 43 of the pan 31 so that chain 36, while moving from the sprockets 40 and 41, runs parallel to the pan 31 to cooperate with it to move the material in an upwardly directed stream along the inner surface of the pan 31. It should be noted that the above arrangement of the three pairs of sprockets is an example of the conveying means and that the configuration and number of pairs of sprockets can be provided as desired to maintain a spacing between the flight along the pan 31 and the return flight.

Attached to the frame at the upper edge 43 of the pan 31, which edge forms a discharge point, is a hood or enclosed chute 44 which forms a control means for guiding and regulating the flow of material discharging from the conveyor means of the device. Each of the side members 23 are enclosed with sheet material to form an enlarged cavity between the pan 31 and an uppermost portion 45 of the conveyor means 35. The cavity forms a storage or holding means for receiving material, which material is in communication with the stream through the openings 38 in the chain conveyor.

In operation, the curved end portion 33 lifts the particulate material from the surface 13 where it is engaged by the conveyor 35 and carried up the inner surface of the pan 31 to the discharge point 43. As discharged, the material falls through the chute or hood 44 into the hopper 14 of the paving device 15 as fast as the conveyor 35 supplies the material to the discharge point.

As illustrated, the hood 44 extends downward and terminates in a bottom opening 46. If the device 15 does not use any material from the hopper 15, the level of material in the hopper 14 will rise until it reaches a level, such as illustrated in broken lines at 47, which closes the bottom opening 46 of the chute 44. By closing the bottom opening 46 of the chute 44, the material is backed up in the chute 44 adjacent the sprocket 41. As the material is backed up, it falls into the storage area between pan 31 and the uppermost portion or flight 45 of the conveying means 35. Since the storage area is adjacent to the portion of the means 35 moving along the pan 31, the material held therein will tend to fall through the openings 38 of the conveying means 35 and into the upwardly moving stream toward the discharge point 43, and be recirculated from the storage means to the conveying means and back to the storage means with a portion moving into the chute 44.

When the rate or demand of the device 15 is less than the rate of lifting material from the surface 13, the discharge of material from the chute or hood 44 is less than the rate at which material is being conveyed to the chute 44 and a backing up of the material is being conveyed into storage area will occur once the hopper 14 reaches the predetermined level 47. Since the device 15 is removing some material from the hopper 14, the material in the chute 44 continues to move downward to replace the material removed from the hopper 14. But any material in excess of that needed to maintain the hopper full is diverted to the storage area. When the amount of material being lifted from the surface 13 is at a rate less than the rate required to maintain the hopper 14 in a filled condition, the material in the storage means (if any) is added to the upwardly moving stream to meet the demand for material needed to maintain the hopper in a filled condition.

The provision of the storage means enables the loader 10 to accommodate surges in the amounts of material lifted from the surface 13 to prevent overloading of the hopper 14. The material in the storage means also enables the loader 10 to maintain the level of particulate material in the hopper 14 at those periods of time when the amount of material being lifted from the surface 13 is insufficient to meet the rate of use of the material by the paver or finisher 15.

To drive the device 10, a propulsion unit 50 such as an internal combustion engine, is mounted on the upper portion of the frame 20 and drives through a gear reduction means 51, the drive sprocket shaft 39 for the conveyor 35. The engine 50 also drives a hydraulic pump 53 which provides hydraulic fluids that drive the pair of rear wheels 22 by means of hydraulic motor and gear reduction unit 54. A hydraulic pump, with pump 53 or another pump, is used to supply hydraulic fluid under pressure which is used in steering the device 10 and to drive other hydraulic actuator.

As best illustrated in FIG. 3, the pair of front wheels 21,21 are each supported on a frame member 60 which is pivotally connected to the main frame at 61 and held at a given angular displacement with respect to the side frames 23 by an adjustable brace 62. Each of the braces 62 is connected to the front frame portion 32 by removable pin 63 and is provided with a series of holes 64 for the pin 63 to allow adjustment in the length of the brace 62 to vary the angles between the frame member 60 and the side frames 23. Each of the frame members 60 is provided with vertically extending panel members 65 which terminate in an edge 66 to form a plow means which will scrape the surface 13 to direct or plow particulate material towards the lifting device 33. By adjusting the braces 62 to a maximum length as illustrated, each of the plow means attached to the frame member 60 increases the effective width of the loader. For purposes of transporting the device between jobs, the frame members 60 are brought to a position parallel with the side frames 23 so that the front wheels 21 are substantially in front of the rear wheels 22, as illustrated in dotted lines in FIG. 3.

To suspend the device, each of the front wheels 21 is attached to the frame member 60 by a hydraulic suspension means 70 comprising a piston disposed in the cylinder which enables the front end of the frame to be raised with respect to each of the front wheels 21. The rear wheels 22 which are connected together by an axle of the gear reduction unit 54 are each secured to the pan 31 by a suspension means 71 including a pivoting arm 72 and a hydraulic actuator 73. Thus for purposes of transporting the loader 10 between jobs, the frame 20 and all its associate parts can be raised to provide clearance for on-the-road travel. Furthermore, by selectively controlling the suspension means 70 and 71 on one side of the frame, the frame can be tilted with respect to the plane or which the wheels 21 and 22 are resting. Furthermore, by individually using one or more of the suspension means 70 and 71, the orientation of the frame 20 with respect to the surface 13 can be corrected to compensate for one or more of the transporting means being on a surface of a different level than the other transporting means. For example, one of the front wheels 21 may be traveling on a paved strip having a higher level than the level of the surface on which the other three wheels are resting.

To steer the loader or device 10, each of the front wheels 21 is connected to a steering system that turns the wheels together regardless of the position of the frame member 60. The system includes a member 80 which is rotatably mounted at each of the pivotal connections 61 of the frame member 60 to the side frame 23. Each of the pair of members 80 has a first lever arm 81 and a second lever arm 82 with the second lever arm 82 being linked together by a tie rod 83. Each of the front wheels 21 has a lever arm 84 which is linked to the first lever arm 81 or the member 80 by a tie rod 85. One of the pair of members 80 has its first lever arm 81 connected to a ram of a hydraulic actuator 86 so that movement of the ram turns both front wheels 21 together. As illustrated in FIG. 3 the frame member 60, the first lever arm 81, the tie rod 85 and lever arm 84 form a parallelogram. Thus, the steering alignment for the front wheels 21 is not affected by changes in the angle between the frame member 60 and side frame 23.

The frame 20 has a draw bar 90 extending from a pivotal connection on the pan 31 and supported by a hydraulic actuator 91. When the loader 10 is operating with a device 15, the device is connected to the draw bar 90 by a detachable connection 92 such as a ball and socket joint. By applying a lifting force to the draw bar 90 with the actuator 91, a portion of the load in the hopper 14 can be transferred to the rear wheels 22 of the loader 10 to reduce the weight placed on the small wheels 94 supporting the hopper 14 of the device 15. Furthermore, due to the interconnection of the loader 10 to the device 15, the loader 10 can be used to help pull or advance the device 15 during working operations.

As mentioned in the above description of the general operation of the device, material, such as asphalt paving material, is deposited on the surface 13 in the general direction of the movement of the paving device. Preferably this material is distributed as a single windrow similar to windrow 95 (FIG. 1) at a rate equal to the rate of demand for the device 15 and approximately along the center of the strip to be paved. However, to deposit this material at a constant rate is a time consuming operation. If the material can be dumped from the truck as a series of piles 96 approximating a windrow, the time required for dumping the material is greatly reduced. Since the loader 10 has a storage capacity, it can handle surges caused by picking up a pile of the material, and the loader does not require the material to be deposited in a windrow having a constant amount therealong.

Since the conveyor 35 is moving in the direction of the arrow 97, the conveyor 35 helps pull the loader through any pile which is higher than the lowest point of travel of the conveyor. Thus the loading device can move through large piles and store any of the excess material for use at a later time.

In the embodiment just described, the loading device or material handling device 10 is a separate unit connected by a detachable connection 92 to a paver or finisher 15. In FIG. 4, an embodiment of the invention 110 is illustrated and has substantially the same structure as the device 10. The difference in the embodiment of the device 110 is the provisions of spreading means, such as a transversely extending auger 116, on the rear of the main frame 120 behind the rear transporting means 122. Disposed behind the auger 116 is a screed 117 for finishing the material spread by the auger 116. The frame 120 is provided with a pair of pivot arms such as 127 which are connected to an upstanding frame member 128 and pivotally connected to screed 117. The screed 117 has means, such as 133, for adjusting its orientation on the pivot arms 127 to enable adjusting the orientation of the screed surface in a conventional manner.

In the embodiment of the device 110, the hood or chute has been modified and is illustrated as a downwardly extending chute 144 which extends downward from the discharge point 143 to the auger 116. Thus material lifted by the conveying means 135 falls down into the auger 116 to be spread across the surface to be paved. The enclosed chute or hood 144 also acts as a supply means for the material spreading means 116. As the hood 144 is filled with particulate material, it reaches the point where the level is adjacent the discharge point 143. At this time any additional material carried by the conveyor means 135 is diverted or backed up into the storage means adjacent the pan 131 and the material is held until it can again enter the upwardly directed stream and be discharged into the chute 144.

The device 110 operates in the same manner as the device 10 and is a self-loading finisher. The device 110 has storage means for evening out the flow of material to the auger 116 and for compensating for irregular rates of depositing of the material on the surface 13 by the trucks 11 or 12 as in the previous embodiment illustrated.

In the system of paving utilizing the method and either apparatus of the present invention, the trucks 11 and 12 can be discharging or depositing their contents on the surface 13 simultaneously in a side-by-side relationship; however, it is expected that generally only one truck will be used at a time but near the end of its step of depositing, a second truck will be brought alongside and start depositing to provide alternate, overlapping windrows which need not be continuous. By increasing the effective width of the lifting means by using the plow means, the spacing and position of windrows can vary within a range which is covered by the effective width of the lifting device. The plow means enables the loader 10 or self-loading finisher 110 to pick up deposit even if a portion has been displaced laterally from the direction of movement of the device (FIG. 1).

While the preferred embodiments are directed to a loader 10 for a paver or finishing device 15 or a self loading finisher 110, the principle of the present invention can be used in a loader for loading particulate material in other devices using particulate materials.

Although minor modifications might be suggested by those versed in the art, it should be understood that I wish to employ within the scope of the patent warranted thereon, all such embodiments as reasonably and properly come within the scope of my contribution to the art.

I claim as my invention:

1. A loader mounted for movement with a paver having a material receiving portion, said loader comprising, a rearwardly inclined conveyor and wall means defining a storage area, which wall means include a rear wall adjacent said conveyor, a chute communicating with the top of said rear wall and arranged for receiving material from said conveyor, said chute having a lower discharge end spaced a predetermined distance above the material receiving portion of said paver whereby any excess material piled up in said material receiving portion of the paver will back up in said chute and drop back into said storage area.

2. A loading machine mounted for movement with an apparatus having a particulate material receiving area, said loading machine comprising, wall means defining a cavity for receiving and storing particulate material, a conveyor in said cavity for elevating material from the bottom of the cavity to an upper portion thereof, a chute having one end thereof communicating with said cavity adjacent said upper portion thereof for receiving particulate material elevated by said conveyor, said chute having its other end spaced a predetermined distance above said material receiving area for discharging material thereinto and for being closed by excess material piling up in said area thereby causing additional material being elevated by the conveyor to back up in said chute and drop back into said cavity for recirculation by the conveyor.

3. The loading machine according to claim 2 wherein said apparatus is a paving machine, said loading machine being supported for movement with the paving machine.

4. A loading apparatus mounted for movement with a paving machine and adapted to transport particulate material deposited on the surface to be paved to the material receiving area of the paving machine, said loading apparatus comprising, wall means defining a cavity for receiving and storing particulate material, said wall means also defining an inlet adjacent the bottom of said cavity and said surface and an outlet adjacent an upper portion of said cavity, a conveyor in said cavity for elevating material from said inlet to said outlet, scraping means adjacent said inlet to facilitate the advancement of particulate material from said surface to a location for being engaged by said conveyor, a chute having one end thereof communicating with said outlet for receiving material elevated by said conveyor, said chute having its other end spaced a predetermined distance above said material receiving area for discharging the particulate material thereinto and for being closed by excess material piling up in said area thereby causing additional material being elevated by the conveyor to back up in said chute and drop back into said cavity for recirculation by the conveyor.

5. The loading apparatus according to claim 4 wherein said loading apparatus is in the form of a separate, self-propelled vehicle.

6. The loading apparatus according to claim 4 further defined by said scraping means including scrapers extending outwardly from both sides of said inlet for directing material on said surface on either side of the path of movement of the loading apparatus toward said inlet in response to movement of the loading apparatus.

7. The loading apparatus according to claim 6 wherein said scrapers are pivotally mounted to each side of the loading apparatus.

8. The loading apparatus according to claim 4 wherein said conveyor includes spaced blades thereby defining openings to facilitate the dropping of excess material to the bottom of said cavity.

9. The loading apparatus according to claim 4 further defined by, said loading apparatus being in the form of a separate vehicle, means connecting said vehicle to said paving machine, said connecting means including lifting means adapted to transfer a portion of the weight of the paving machine to said vehicle.

10. The loading apparatus according to claim 4 further defined by, said conveyor being mounted for movement in a direction opposite the direction of movement of said paving machine as the conveyor passes said inlet whereby the engagement of the conveyor with the material on said surface assists in moving the paving machine.

11. The loading apparatus according to claim 10 wherein said loading apparatus is in the form of a separate, self-propelled vehicle connected to said paving machine.

12. The loading apparatus according to claim 4 wherein such apparatus is an integral part of the paving machine.

13. The loading apparatus according to claim 6 wherein such apparatus is in the form of a separate vehicle having a pair of front wheels, said pair of wheels being mounted on respective pivotable arms connected to opposite sides of the apparatus with each of the pivotable arms having means for varying the angle thereof with respect to the path of movement of the apparatus thereby to enable selection of the transverse spacing between said wheels, and wherein said scrapers are carried by said arms, respectively.

* * * * *

UNITED STATES PATENT OFFICE
CERTIFICATE OF CORRECTION

Patent No. 3,693,512            Dated September 26, 1972

Inventor(s) Fred T. Smith

It is certified that error appears in the above-identified patent and that said Letters Patent are hereby corrected as shown below:

In column 3, line 55, the number appearing as "15" should read --14--.

In column 4, lines 8 and 9, after "material" delete "is being conveyed".

In column 4, line 40, "with" should read --either--.

In column 5, line 34, after "81", "or" should read --of--.

Signed and sealed this 6th day of February 1973.

(SEAL)
Attest:

EDWARD M. FLETCHER, JR.
Attesting Officer

ROBERT GOTTSCHALK
Commissioner of Patents